United States Patent
Close

[11] 3,807,829
[45] Apr. 30, 1974

[54] EXTENDED-FIELD HOLOGRAPHIC LENS ARRAYS

[75] Inventor: Donald H. Close, Topanga, Calif.

[73] Assignee: Hughes Aircraft Company, Culver City, Calif.

[22] Filed: Apr. 30, 1973

[21] Appl. No.: 356,069

[52] U.S. Cl. .......................... 350/3.5, 350/162 ZP
[51] Int. Cl. ...................... G02b 27/00, G02b 5/18
[58] Field of Search ...................... 350/3.5, 162 ZP

[56] References Cited
UNITED STATES PATENTS

| | | | |
|---|---|---|---|
| 3,586,412 | 6/1971 | Leith | 350/3.5 |
| 3,575,485 | 4/1971 | Van Buskirk | 350/3.5 |
| 3,630,594 | 12/1971 | Gorog | 350/3.5 |
| 3,637,307 | 1/1972 | Spitz | 350/3.5 |

Primary Examiner—Ronald J. Stern
Attorney, Agent, or Firm—W. H. MacAllister; Walter J. Adam

[57] ABSTRACT

Multiple holographic lenses are provided in the same structure by recording in a spatial array the interference patterns of coherent reference and object beams from pairs of point sources to provide an increased field of view with high resolution. A method for constructing, evaluating and correcting the arrays is disclosed. In constructing the array of holographic lenses, the focal points of the object and reference beams are selected to divide the angular field of view across an extended field. All object points are on one selected focal plane and all reference points are on another focal plane, such as at infinity. When the recorded array is illuminated with coherent light of the proper wavelength from points on one image plane, the light is imaged on the other focal plane, such as the focal plane at infinity as viewed from the side of the array opposite the side of the array from which the holographic lenses were formed with the missing beam. The same techniques apply to reflection lens arrays and to transmission lens arrays.

18 Claims, 25 Drawing Figures

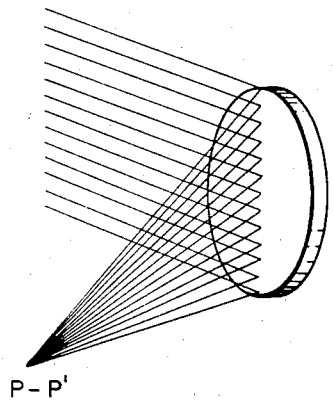
Fig. 1.
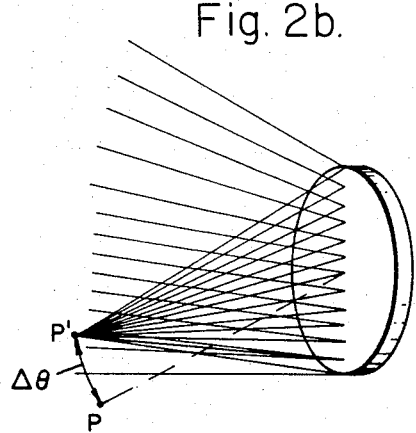
Fig. 2a.
Fig. 2b.
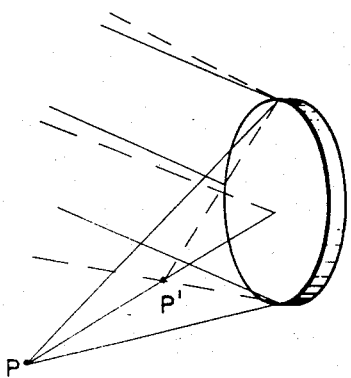
Fig. 2c.

UNALIGNED INTERSECTIONS    ALIGNED INTERSECTIONS

| $E_8$ | $E_6$ | $E_3$ $f<f_2$ | $E_5$ | $E_7$ |
|---|---|---|---|---|
| $E_{12}$ | $E_{10}$ | $E_1$ $f_0<f_1$ | $E_9$ | $E_{11}$ |
| $E_{16}$ | $E_{14}$ | $E_0$ $f_0$ | $E_{13}$ | $E_{15}$ |
| $E_{20}$ | $E_{18}$ | $E_2$ $f_1<f_0$ | $E_{17}$ | $E_{19}$ |
| $E_{24}$ | $E_{22}$ | $E_4$ $f_2<f_1$ | $E_{21}$ | $E_{23}$ |

Fig. 10.

| $E_8$ | $E_6$ | $E_3$ | $E_5$ | $E_7$ |
|---|---|---|---|---|
| $E_{12}$ | $E_{10}$ | $E_1$ | $E_9$ | $E_{11}$ |
| $E_{16}$ | $E_{14}$ | $E_0$ | $E_{13}$ | $E_{15}$ |
| $E_{20}$ | $E_{18}$ | $E_2$ | $E_{17}$ | $E_{19}$ |
| $E_{24}$ | $E_{22}$ | $E_4$ | $E_{21}$ | $E_{23}$ |

Fig. 11.

Fig. 16.
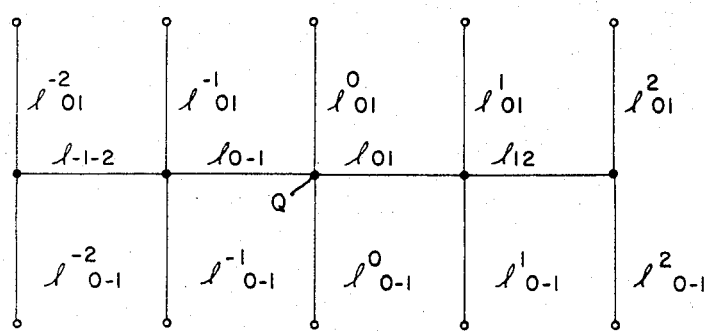
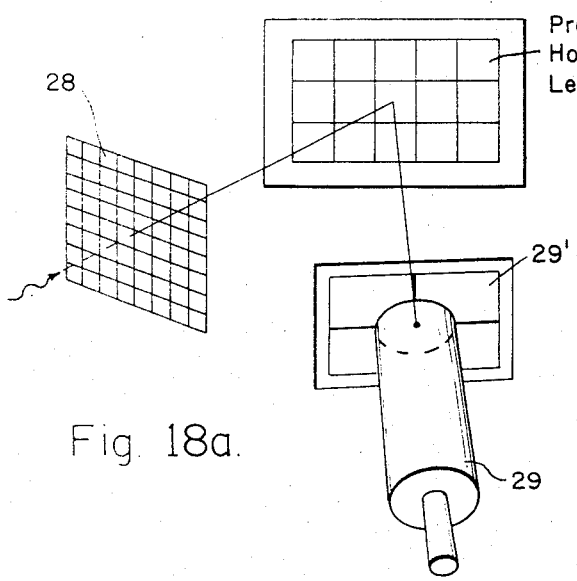
Fig. 18a.
Fig. 18b.
Fig. 17.
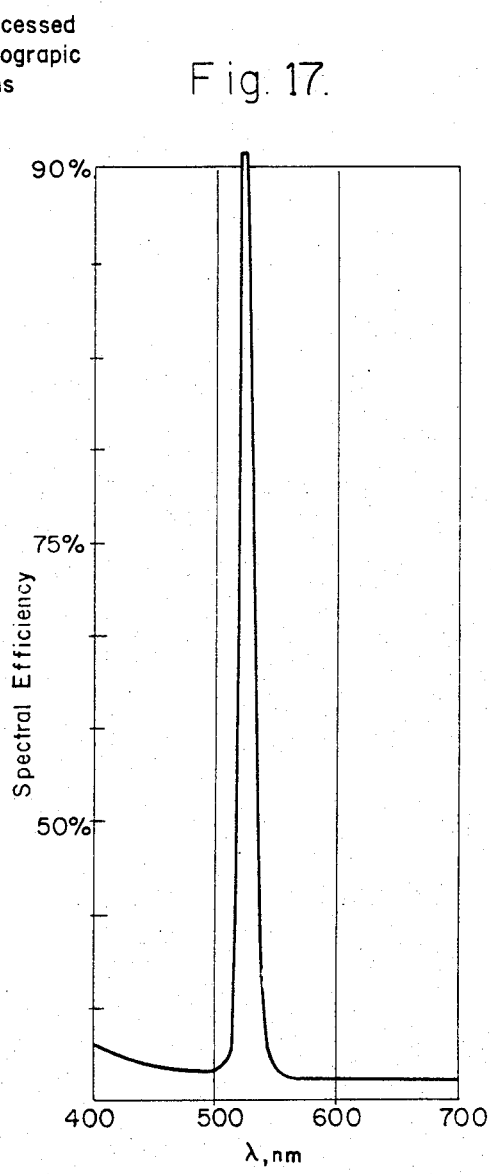

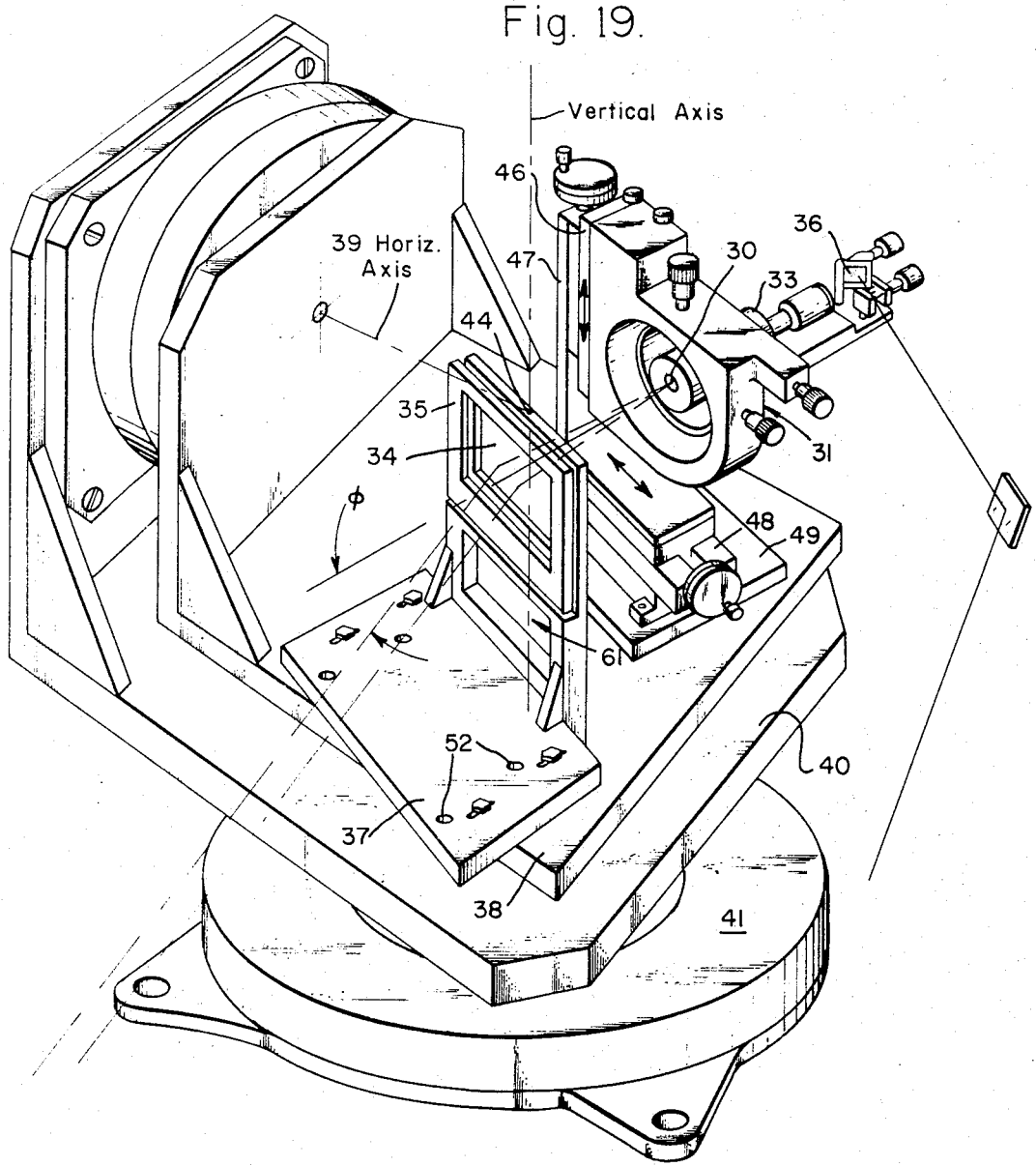

3,807,829

EXTENDED-FIELD HOLOGRAPHIC LENS ARRAYS

BACKGROUND OF THE INVENTION

This invention relates to a holographic lens, and more particularly to an aligned spatial array of holographic lenses.

Single holographic lenses have been studied extensively. A brief description of a lens consisting of a single hologram and associated difficulties is given by E. N. Leith and J. Upatnieks in "Zone Plate with Aberration Correction," J. Opt. Soc. Am. 57, 699 (1967). To circumvent some of the difficulties, the authors suggest using the angular selectivity of a volume hologram. However, such a technique requires a relatively large number of holograms to be super-imposed in the same material. Application of a single hologram having focal power to a display system is described in D. G. McCauley, C. E. Simpson and W. J. Murbach in "Holographic Optical Element for Visual Display Applications," App. Opt. 12, 232 (1973). However, these holographic lens systems are all characterized by a narrow field of view due to strong off-axis aberrations. For many applications a wider field of view is required, such as for display of widefield imagery without ordinary glass lenses which are bulky and heavy.

SUMMARY OF THE INVENTION

In accordance with the invention, a holographic lens is comprised of an array of contiguous holograms. Each hologram is constructed by recording and fixing in light-sensitive material an interference pattern between two mutually coherent beams of light. Each beam originates at a point source in a different one of two surfaces, thus forming a holographic lens with conjugate focal points on the two surfaces such that when the lens is thereafter illuminated by point sources of light in one surface forming an image, the point sources are imaged on the other surface. Different parts of the resulting projection aperture correspond to different parts of the field of view; consequently, the angular field and the projection aperture are divided into small segments, and a hologram is formed in each segment using two mutually coherent beams as described. Discontinuities in the projected image are minimized by so choosing the locations of the point sources that fringe planes in some adjacent holograms are parallel at the intersection of the holograms, or as nearly so as possible with any deviation from the ideal selected to minimize localized distortion of the image. One surface of point sources used for forming a lens may be a plane virtually at infinity, thus forming a collimating lens for projecting out to infinity an image from the other surface.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 illustrates in a chart the manner in which three types of holograms may be recorded for use as an optical element having focal power for use as a lens in the playback mode.

FIGS. 2a, 2b and 2c illustrate inaccuracies of a single-element holographic lens for off-axis and off-focal plane reconstruction.

FIG. 10 is an exemplary alignment pattern for an array of 5 × 5 elements.

FIG. 11 shows an exaggerated simulation of the discontinuities trapezoidal distortion appearing in the projected image of three parallel vertical lines with the array of holographic elements of FIG. 10 having unaligned intersections indicated by dotted lines.

FIG. 16 illustrates incremental displacements of a diverging beam point source to form the array of FIG. 15.

FIG. 17 illustrates the spectral efficiency of a typical reflection hologram recorded in dichromated gelatin.

FIG. 18a illustrates schematically a test fixture for evaluating a hologram array, and FIG. 18b is an illustration used in describing the use of the test fixture.

FIGS. 19 and 20 illustrate in an isometric view actual apparatus implemented for forming holographic lenses according to the present invention.

DESCRIPTION OF THE PREFERRED EMBODIMENTS

Figure 3:
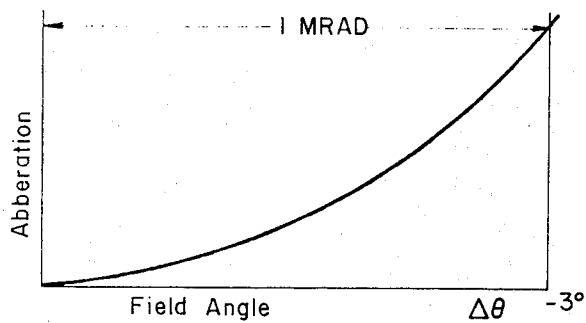
FIG. 3 is a graph of aberration in a single-element holographic lens as a function of off-axis angle.

Before describing the present invention in greater detail, the manner in which a single hologram may be formed for use as a lens (an optical element having focal power) will be first described with reference to a chart in FIG. 1 which illustrates three techniques for recording a hologram and for thereafter playing back the hologram. These techniques are used to form three different types of holographic lenses, namely a reflection type, a transmission type, and a pseudo in-line transmission type. Only so much of the field of holography will be discussed as is necessary to understand the concept of the invention in preferred embodiments. More extensive treatments of the field of holography may be found in numerous references.

A hologram is a recording of the wave interference patterns formed when two beams, an object beam, O, and a reference beam, R, of sufficiently coherent light from two point sources are superimposed in a suitable recording medium. The two point sources can be considered the two conjugate points of a lens.

In playback, light from one conjugate point appears to come from the other conjugate point, thereby providing the function of a virtual image lens. The reflection and transmission types of holographic lenses shown in the chart are the two fundamental types of off-axis holograms. The third type is a combination of two off-axis transmission holograms, the second having its two conjugate points at infinity. This third type has two interesting properties. First, it is approximately axially symmetric and therefore has lower distortion. Second, it has considerably smaller chromatic dispersion than the other two types. All three types can be used in display systems as will be shown.

From the foregoing, it is evident that a single-element holographic lens is recorded by illuminating light-sensitive recording material with two beams of light from the same source of constant phase and narrow spectral bandwidth through paths of sufficiently equal length to maintain a high degree of coherence. Both beams originate from point sources, one of which typically is at infinity as indicated in the chart by a collimated reference beam, R, from the second point at infinity in each case of recording. After the hologram has been recorded and processed, it can be illuminated by either of the two recording beams at the operating wavelength of the hologram to cause it to accurately generate for viewing the other recording beam. For example, as indicated in the chart for playback, a diverging beam from a focal point $P'$ interacts with the hologram to recreate the collimated reference beam, R. A viewer looking into this beam sees the point $P'$ projected to infinity by the hologram. If the point source is displaced, the direction of the collimated beam changes by an angle equal to the angle subtended at the hologram by the original and the displaced point source. Therefore, the hologram has the ability to image an extended field. This field consists of only light at the operating wavelength. To the rest of the spectrum, the hologram acts as a clear plate.

Although the hologram can image an extended field, it does not do so with unlimited accuracy. Aberrations appear for off-axis reconstruction as deviations of some rays in the collimated beam from the expected direction. These deviations are largest for rays near the edge of the hologram and increase as the displacement of the imaged point, $P'$, from the hologram recording point, $P$, is increased, as shown by comparison of FIGS. 2a and 2b. If the imaged point, $P'$, is at the recording point, there are no aberrations as shown in FIG. 2a, but if the imaged point, $P'$, is offset, transversely from the recording point, there are aberrations as shown in FIG. 2b. The aberrations increase as the field angle, $\Delta\theta$, is increased and as the $f$-number is decreased. If the typical maximum aberration is plotted as a function of the field angle as shown in FIG. 3 for a given $f$-number, it is apparent that the aberration becomes 1 mrad at a half-field angle of 3° to 5° for typical hologram parameters. An array of hologram lenses according to the present invention will provide image resolution and accuracy of better than 1 mrad over field angles of 30° to 45° or more, depending upon system and configuration requirements.

Effects of the off-axis aberrations indicated schematically in FIG. 2b depend strongly on applicable hologram parameters, particularly the off-axis angle, the asymmetry angle, and the size of the viewing pupil. For viewing with the eye, the effects of the aberrations are generally to introduce distortion rather than a loss of resolution, because over a bundle of rays the size of the eye pupil, the ray directions do not vary appreciably. However, as pupil location is changed, the average ray direction changes, causing the apparent image location to shift.

Another characteristic of these holograms is that as the object point $P'$ is moved from the hologram construction location $P$, the efficiency of conversion of the diverging beam into the collimated beam decreases. This loss of optical efficiency arises because the conversion process is Bragg diffraction from the recorded fringe planes in the hologram medium, a process sensitive to the beam angles. This angular dependence of optical efficiency effects the optical efficiency of a single hologram lens as a function of the field of view. For typical geometries, the angular width of the efficiency curve is 5° to 10° in the plane containing the optical axis and somewhat larger in the perpendicular plane. This fact also places a limitation on the performance of a single lens.

As in other types of lenses, deviation of the object from the focal plane will also cause aberrations, as shown in FIG. 2c. However, it is a relatively simple matter to place the image source in the focal plane of the lens.

In order to achieve high performance, it is necessary to use a multiple-element holographic lens, i.e., an array of holograms in accordance with the present invention. A single-element holographic lens cannot provide the required optical efficiency, and the more nonlinear distortion of the single element holographic lens leads to much larger pupil errors. This behavior is not surprising, since a single hologram, like a single lens or mirror element, has large off-axis aberrations. Therefore, a multiple-element holographic lens is required. This is analogous to multiple-element lenses required in a conventional lens system, but is advantageously unique in that all elements (holograms) may be provided on a transparent substrate, and in that the holographic lens array may also function as a combining plate.

This array concept is based on the fact that in many optical systems, rays from a single point in the field of view that enter the viewer's eye come through only a small part of an aperture in the system. In other words, different parts of the aperture correspond to different parts of the field of view. This means that the angular field and the aperture can be divided into small segments, and one can synthesize a small hologram (hereinafter referred to as a "holographic element") in each segment of the aperture. If these holographic elements are small enough and accurately aligned, they project a continuous high-quality image over the entire field of view.

The fundamental advantages of this array concept are a reduction in the loss of resolution and distortion due to off-axis aberrations, and more uniform optical efficiency across the aperture. To maximize these advantages, it is necessary to deal with two difficulties associated with implementing the array concept. First, an array can exhibit distortion that varies with eye position, although usually far less than for a single hologram. Second, the presence of intersections between adjacent holographic elements in the array introduces the possibility of discontinuities in the image if proper alignment is not achieved.

Design of an array of holographic elements for use in projecting an image is based on two criteria: first, the image to be viewed from a certain location (the pupil location); and second, adjacent elements of the array provide a continuous image to the observer. The first criterion is met by forming each element with a beam that passes through the pupil location and a diverging beam from a point source located in the system source plane. The second criterion is met by choosing the location of the point sources such that the fringe planes in two elements are parallel at the intersection of the elements, thereby providing a "mirror without a kink." The basic design approach will now be described more fully, but first it should be noted that this basic design can have unaligned intersections between holographic elements of the array at which localized distortion can occur even when there is no average system distortion. However, in a proper design, this local distortion is reduced to insignificant proportions.

Figure 4:
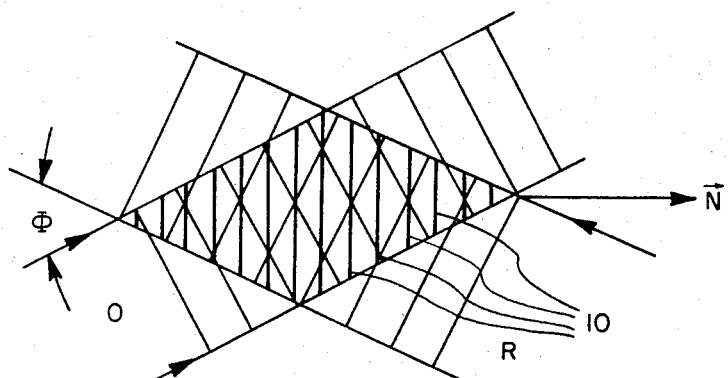
FIG. 4 is a diagram illustrating a relationship of fringe-plane orientation to the direction of hologram-forming beams.
Figure 5:
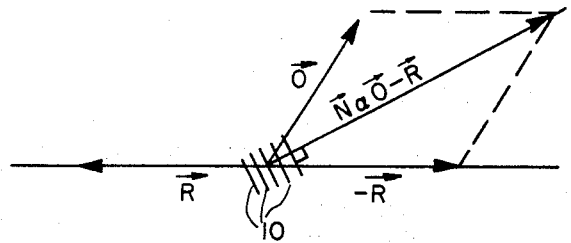
FIG. 5 is a unit vector diagram illustrating the same relationship as FIG. 4.

The basic array formation process is based on alignment of adjacent holographic lens elements in the array by controlling the fringe orientation. The relationship of fringe-plane orientation to the directions of the hologram-forming beams is indicated in FIG. 4. The two beams may be referred to as a reference beam, R, and an object beam, O. In a small volume the directions of the beams are well defined and these two directions define a plane in space. The fringe planes 10 (indicated by heavy lines) formed by these two beams are normal to the plane of the two beams (i.e., normal to the plane of the paper) and the fringe planes bisect the angle Φ between the two beams. Therefore, the normal to the fringe planes lies in the plane of the two beams and bisects the angle formed by one beam direction and the reverse of the other beam direction. A unit vector diagram of FIG. 5 shows the same relationship as FIG. 4. The unit vectors are used in the following discussion.

If the directions of the two formation beams are specified by unit vectors $\vec{R}$ and $\vec{O}$, then the unit vector normal to the fringe planes is $\vec{N}$ and $$\vec{N} \alpha \vec{O} - \vec{R}. \tag{1}$$

Two independent sets of fringe planes defined by their normals $$\vec{N_1} \alpha \vec{O_1} - \vec{R_1} \tag{2}$$

and $$\vec{N_2} \alpha \vec{O_2} - \vec{R_2} \tag{3}$$

can therefore be aligned as desired by making $\vec{N_1}$ parallel to $\vec{N_2}$, or $$\vec{N_1} = \vec{N_2} \tag{4}$$

The vector $\vec{O} - \vec{R}$ is normal to the fringe planes in space.

Figure 6:
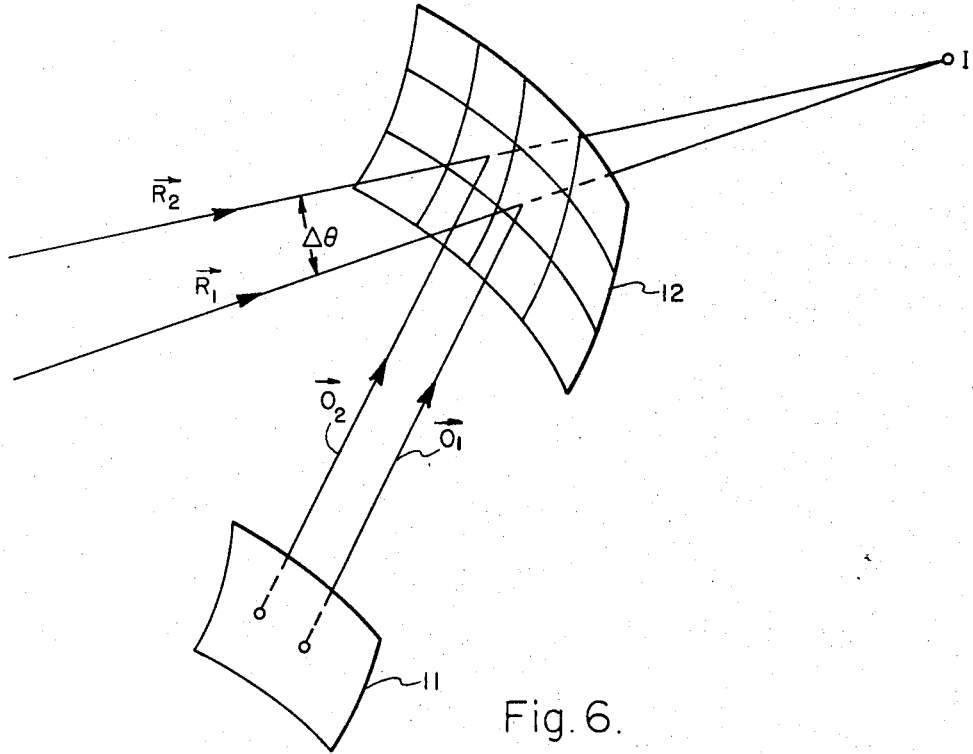
FIG. 6 illustrates diagrammatically an arrangement of beams for forming a hologram.

FIG. 6 illustrates an arrangement of beams for forming a hologram for a transmission-type lens, where the object beam, $O_t$, is a diverging beam, and the reference beam, $R_t$, is a collimated beam. The object beam originates on a surface 11, which may be a flat or curved surface, and the fringe planes are formed in a film of recording material on a substrate 12. For a reflection-type lens, the object beam is directed onto the film of recording material from the opposite side of the reference beam. For simplicity only a reflection-type will be considered hereinafter, it being understood that all principles to be discussed apply for both types as well as to the pseudo in-line type. Also for simplicity only, a system with planar symmetry is discussed, but the general design system allows an arbitrary (skewed) geometry. Neither the array of elements nor the surfaces of object and reference beam point sources need be flat. It should also be understood that the reference beams are not required to be collimated, i.e., not required to be from point sources on a surface virtually at infinity. The reference beams may be from points on a surface at a finite distance, in which case an image is focused on that surface when the reference beam is reconstructed during playback.

Figure 7:
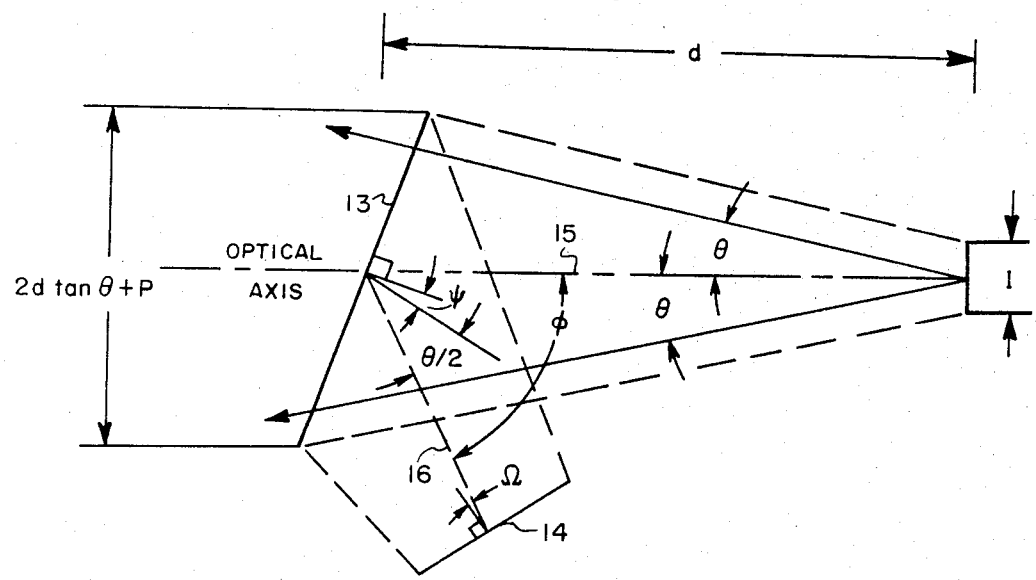
FIG. 7 illustrates an operational system configuration for a display system.

FIG. 7 schematically illustrates, in a side view, an operational system configuration using a holographic lens array 13 for a display, such as a head-up display in an aircraft cockpit. An image produced in a plane 14 is viewed along an optical axis 15 from a viewing pupil of dimension P at a distance d from the center of the array. The array is assumed to be flat, but it may be curved, such as for visual display on a spherical shield of Plexiglas on the helmet of an aircraft pilot.

For a total angular field of view of 2θ, the input surface must project to a vertical height of approximately 2d tan θ+P. The input optical axis 16 is deviated by an angle of 180°−φ to coincide with the viewing optical axis. If the holographic lens array were instead simply a combining plate, i.e., a combiner, its normal must bisect the angle φ, requiring the asymmetry angle Ψ in FIG. 7 to be equal to zero. The holographic lens array 13 does not require the angle Ψ to be zero. It also does not require the angle Ω to be zero; it only requires that playback image source be in the same plane as the plane of object point sources used during formation of the holographic lens. In general, the image errors increase as the off-axis angle φ is increased. This point will be discussed more thoroughly hereinafter.

Figure 8:
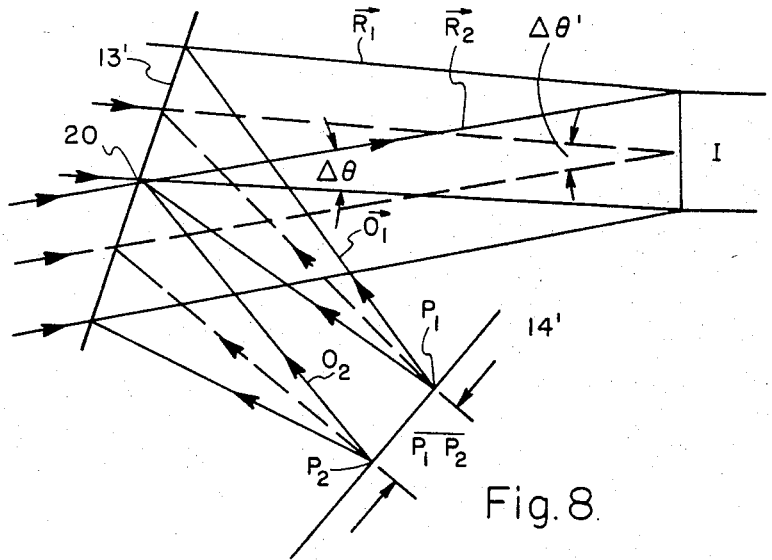
FIG. 8 is a diagram illustrating the geometry for hologram fringe alignment at the intersection of two array elements.
Figure 9:
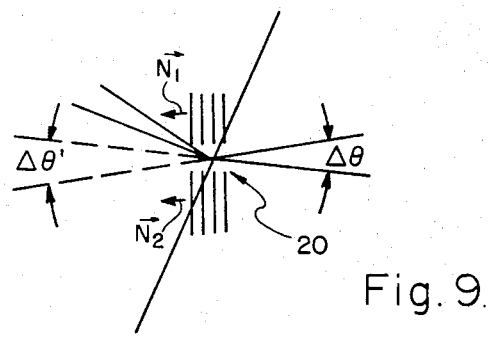
FIG. 9 is an enlargement of the geometry in FIG. 8 at a particular intersection between holographic elements.

The directions $\vec{R}$ of the collimated reference beams used to form the holograms, the holographic lens elements of the array 13, are specified by the set of lines connecting the centers of the elements to the center of the pupil area and the desired image plane. One object point direction $\vec{O_1}$ is specified by establishing the center of the system source plane and the center of the array plane. The other object point directions $\vec{O_i}$ are chosen through Equations (2) and (3) to satisfy the alignment condition, Equation (4) at the intersection of adjacent elements. This geometry is more clearly indicated in FIG. 8. It should be noted that $\vec{R}_1$, $\vec{O}_1$ need not lie in the same plane as $\vec{R}_2$, $\vec{O}_2$ to keep $\vec{N}_1 = \vec{N}_2$, and also that in an N × M array there are 2NM − (M+N) intersections, but only NM − 1 alignments available, so not all intersections in the array can be aligned unless N or M is equal to 1. The position of the point source for the first element is at position $P_1$ on a source plane 14' corresponding to the image plane 14 of FIG. 7 during playback. For the second element, the position $P_2$ of the point source is chosen so that $\vec{N}_2 = \vec{N}_1$. The point source position $P_1$ for the first element, the center of the pupil and the centers of the arrayed elements are fixed in the configuration by systems considerations, i.e., by considerations of how the holographic lens is to be used, and by the choice of a substrate surface and the distribution of elements. The point source position $P_2$ for the second element is then chosen such that the distance $\overline{P_1P_2}$ subtends an angle $\Delta\theta' = \Delta\theta$ at the intersection 20 between the elements. FIG. 9 illustrates the resultant alignment of fringes 10' of one element with fringes 10'' of an adjacent element at the intersection 20 when this alignment criterion is satisfied.

Since all elements of an array cannot be aligned a suitable choice must be made as to which elements are to be aligned. It should also be noted that the elements need not be rectangles. They may be of any shape chosen to completely fill the aperture with an array, such as triangles or hexagons.

A system design definition for producing an array of elements in a holographic lens gives all $\vec{R}_i$ and $\vec{O}_i$. A set of unit vectors $\vec{R}_1$, $\vec{O}_1$ and $\vec{R}_2$ yield the unit vector $\vec{O}_2$, and thus the point source position $P_2$. Another set $\vec{R}_2$, $\vec{O}_2$ and $\vec{R}_3$ yield $\vec{O}_3$, and thus the point source position $P_3$, and so forth until all elements have been produced. The key equation may be stated in general terms as follows:

$$\vec{O}_{i+1} - \vec{R}_{i+1} \parallel \vec{O}_i - \vec{R}_i \quad (5)$$

That equation is used in establishing elements with aligned intersections in a desired pattern of alignment. Equation (5) states the condition that satisfies Equation (4), where $N_i$ is a unit vector defined by the equation:

$$N_i = (\vec{O}_i - \vec{R}_i / |\vec{O}_i - \vec{R}_i|) \quad (6)$$

A suitable choice for aligning a 5 × 5 array is shown in FIG. 10 where the central vertical column is first aligned and then each horizontal row is aligned to the corresponding element of the central vertical column. The aligned intersections are indicated by solid lines and the unaligned intersections are indicated by broken lines. The elements are numbered $E_0$ through $E_{24}$ in a suitable sequence of alignment.

The effect of the above formation procedure on the optical characteristics of the array depends on the system geometry. For an off-axis system with the image plane 14 perpendicular to the optical axis, such as indicated in FIG. 7, with the angle $\Omega$ equal to zero, the focal lengths of the elements vary across the array, as indicated in FIG. 10. The changing focal length introduces distortion into the projected image. This distortion is a property of an imaging element that has a varying focal length over its aperture. However, because the array has discrete elements the distortion may be discontinuous. In fact, the image of a set of three parallel vertical lines as seen in an array having this geometry is indicated on an exaggerated scale in FIG. 11, where the expected trapezoidal distortion is present along with discontinuities (out of focus) at the intersections of the array elements.

Figure 12:
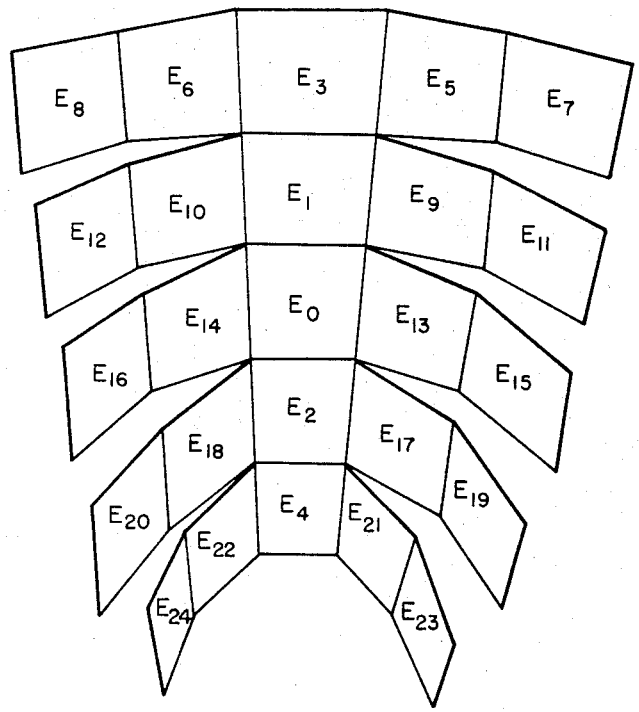
FIG. 12 shows an optical topology of an array of elements aligned as in FIG. 10.

The variation of focal lengths across the array in this geometry is a result of the image (focal) plane not being parallel to the array of elements. For a small spatial offset $\delta l$ in the image plane, an apparent angular offset $\delta\theta$ will be present in the image such that $\delta\theta/\delta l = 1/f$. Because $f$ varies across the array, there is a corresponding variation in $\delta\theta/\delta l$, the "angular magnification." Another way of stating this effect is that there is a variation of optical curvature across the array such that where the focal length is smaller the curvature is larger. If the optical configuration of the array corresponding to FIG. 10 is drawn, the result is indicated in FIG. 12. In this representation, the origin of the discontinuous distortion is clearly the varying curvature of the mirrors. Because of the discrete nature of the hologram array, this discontinuous distortion can be conveniently decomposed into the two components of "global" distortion due to the variation of the focal length from hologram to hologram, and local distortion, due to the variation of the focal length within a hologram.

Figure 13:
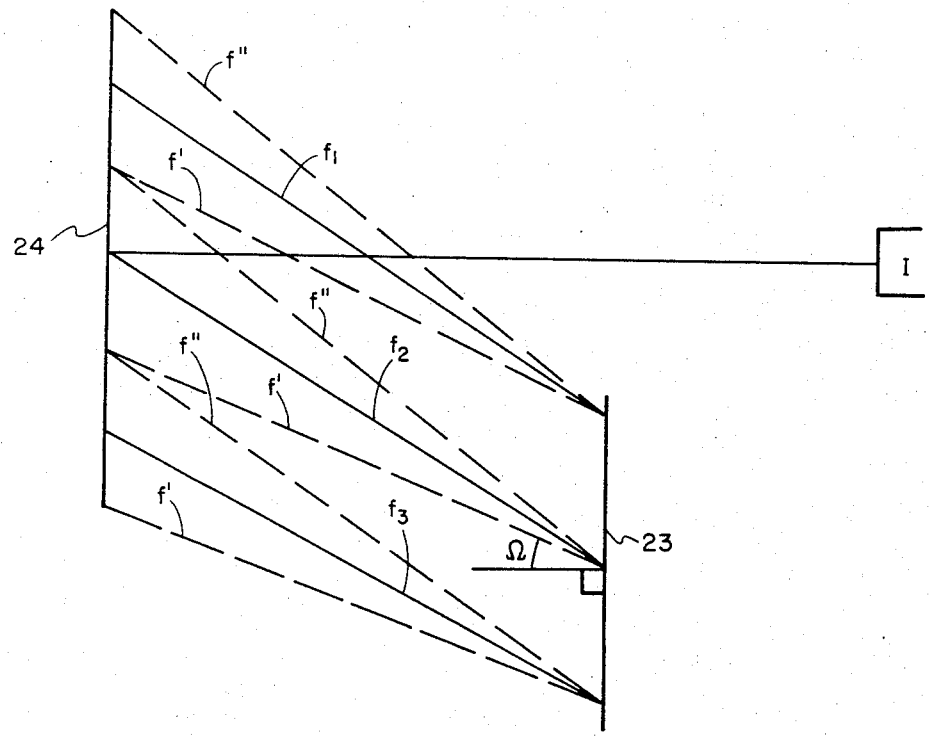
FIG. 13 shows the manner in which an image plane may be tilted such that the central focal lengths of all holographic elements are nearly equal.

The global distortion can be corrected, even in the off-axis system, by a proper orientation of the source plane. For a given geometry, an orientation of the source plane can be found such that the central focal lengths of the elements are nearly equal, as shown in FIG. 13. The extent to which the central focal lengths can be equalized depends on the system geometry, and this is one factor in choosing the system configuration. Typically, the global distortion can be reduced by a factor of 10 or more. Residual variations depend on other array parameters, so that extensive calculations are required to provide a highly optimized array design.

The realization of equal central focal lengths (i.e., the distance from the construction point source to the center of the element) provides a projected image with low average distortion. However, localized distortion still can be present in the image. As pointed out hereinbefore, this localized distortion occurs because the focal length varies over the aperture of an individual hologram even though the central focal lengths are constant. This is indicated in FIG. 13, wherein it is apparent that $f' \neq f''$ for each of separate point sources on a tilted source plane 23 for approximately equal focal lengths $f_1$, $f_2$ and $f_3$ to the centers of elements on an array 24. The size of the local distortions can be estimated from the array geometry. For an off-axis angle $\phi$ of 40°, the local distortions can be several milliradians.

Correction of local distortion is the main task of hologram array design. A number of methods for correcting the local distortion caused by unaligned intersections in the array include the following:

1. Larger number of elements in the array,
2. Decreased off-axis angle,
3. Use of a linear array (single column),
4. Distribution of the misalignments,
5. Use of curved point and image source surfaces, and
6. Use of a "warped" design.

Increasing the number of elements in the array, particularly the number of rows, is a very strightforward approach which reduces the angle subtended by the individual hologram lens at the source plane and thereby reduces the local variation of focal length. Carried out to the extent feasible will produce a holographic lens which approaches a continuous lens. The main disadvantage is the number of steps in the fabrication of the array.

Decreasing the off-axis angle also has the advantage of decreasing the amount of average distortion that needs to be removed, i.e., the amount of source plane tilting required.

If a single column (linear array) of holograms is used, all intersections can be aligned and no local distortion remains. This is somewhat misleading, requiring understanding that the alignment is perfect only at a single point along the intersection. Therefore, there still can be misalignment at other points along the intersection, especially for an extended intersection. However, misalignment can be made small in some cases so this can be an attractive approach which also simplifies fabrication.

In the configuration of FIG. 10, the central column and each horizontal row are aligned, with all misalignments occurring along the horizontal intersections between rows. This alignment procedure was chosen arbitrarily; by changing the alignment procedure, it is possible to distribute the misalignment so the local distortion is more uniformly distributed. This can be a useful technique for cases where the amount of distortion is relatively small, initially.

Use of curved point and image source surfaces can reduce the variation of focal length across the array and thereby reduce the amount of local distortion.

Because resolution is not a first-order problem in these systems, the hologram construction point sources can be changed under the restriction that the same object/image relationship hold. This technique has been called a "warped" design, by which it is possible to modify the distortion properties of the elements while still maintaining a high optical efficiency. In general, the modifications are to be toward reducing the changes in curvature and orientation of the array elements. The simplest effective modification is to change the location of the recording pupil from that of the playback pupil.

A system design may, of course, be checked optically after a lens has been produced. However, it may be desirable to analyze the distortion properties of the design before producing a lens using ray tracing techniques. The following is a description of ray-tracing techniques that have been used. The imaging problem is substantially simplified by assuming that for the system the eye pupil limits the accepted ray bundle in such a manner that there is no resolution loss. This means that only the central ray of the bundle need be calculated because this ray defines the direction of the image.

With this assumption, the approach that may be used is to calculate and plot the images of a set of concentric squares on the object plane. This produces a graphic and easily interpreted display of the image size and distortion properties.

The procedure then is to define an array and to calculate the set of construction point-source locations that satisfy the array alignment criteria previously described. With these data, a set of concentric squares is produced on the source plane of the array and for each of a set of 400 equally distributed points on each square, a location on the array is found that directs a ray from that point through the desired point in the pupil. The direction of this ray thus defines the direction of the image of that point, and the set of directions for the 400 points on each square defines the image of that square. An x-y plot of these data then provides an image as an observer would view it. Qualitative and quantitative measurements then can be made to evaluate the image and thereby the array. By racing rays through two points in the pupil, the amount of pupil error can be measured.

The manner in which a holographic lens may be formed using an alternate design approach will now be described by way of example. First a brief outline of the process of two-dimensional array formation is as follows:

1. Construct and calibrate the hologram forming apparatus.
2. Calculate the apparatus settings for each of the element exposures in the array.
3. Prepare photographic plates, e.g., dichromated gelatin plates, and insert a plate into the hologram forming apparatus.
4. Make the set of reflection hologram exposures and process the plate.
5. Place the finished array in a test fixture and evaluate its performance.
6. If necessary, correct the apparatus settings and/or the exposure levels for the appropriate array elements, and repeat steps 4 through 6 until an array is produced that is acceptable, each time using a fresh plate.
7. Place the last array in a system for use, and store the apparatus settings and exposure levels for use in producing additional arrays.

A plan view of the apparatus required to position the reference and object beams for this example of producing a reflection holographic lens is shown schematically in FIG. 14, in which the parts A through N are as follows:

A. — Laser operating with adequately long coherence length at the wavelength desired for the hologram recording, which depends largely upon the recording material used, such as 514 nm for dichromated gelatin.

B. — Dielectric beamsplitter providing approximately 1:1 power ratio in two beams.

C. — $C_1$, $C_2$, $C_3$ and $C_4$ moveable and adjustable mirrors.

D. — Beam expander and spatial filter to provide, for example, a 3–5 $\mu$m diameter source as a point source.

E. — Recollimating telescope and spatial filter to provide a collimated beam source somewhat larger in diameter than the holographic elements to be formed.

F. — Adjustable masks to fix the holographic element size, shape and location, one on each side of a plate for each hologram element of the array to be formed.

G. — Oriented plate holder.

I. — Pivot point, in a plane containing the center point Q (FIG. 15) of the array on the plate and a line normal to the plate.

J. — Pivot arm carrying elements E and $C_3$ about the pivot point.

K. — Gimbal mount having two axes carrying beam expander and spatial filter D the spatial filter pinhole of which is located at the intersection of the two perpendicular gimbal axes to provide a positioned point source.

M. — Pointer attached to pivot arm J, used to set the pivot arm at a specified angle.

N. — Two-dimensional scale to be used in conjunction with the pointer M to position the pivot arm reproducibly within 0.2 mrad. One scale is for measuring position of the arm J about the pivot point I in the plane of the paper, and the other is for measuring position about the pivot point I in a plane normal to the paper.

O. — Diverging beam from pinhole point source of D.

PE. — Positioning elements to reproducibly locate the point-source pinhole of the beam expander and spatial filter D in space with 25 μm accuracy by positioning the gimbal mount K.

R. — Collimated beam from E.

Stability of the apparatus, provided through use of techniques, such as adjusting screws and lock nuts, that constitute standard practice, must be adequate to record 180° holograms with 10 min. exposure times. Location of the pivot point I, orientation of the plate, dimensions of the apparatus, and settings of the pivot arm J, the gimbal K, the positioning elements PE and two apertures in the mask F for each hologram exposure are determined by the display system parameters and the array design parameters as described hereinafter. The mirrors $C_1$, $C_2$, $C_3$ and $C_4$ are used to direct the two laser beams formed by the laser A and beamsplitter B, through beam expander and spatial filter D and recollimating telescope and spatial filter E to form the diverging object beam, O, and the collimated reference beam R. Adjustment of these mirrors is made for each hologram exposure of the array.

Figure 15:
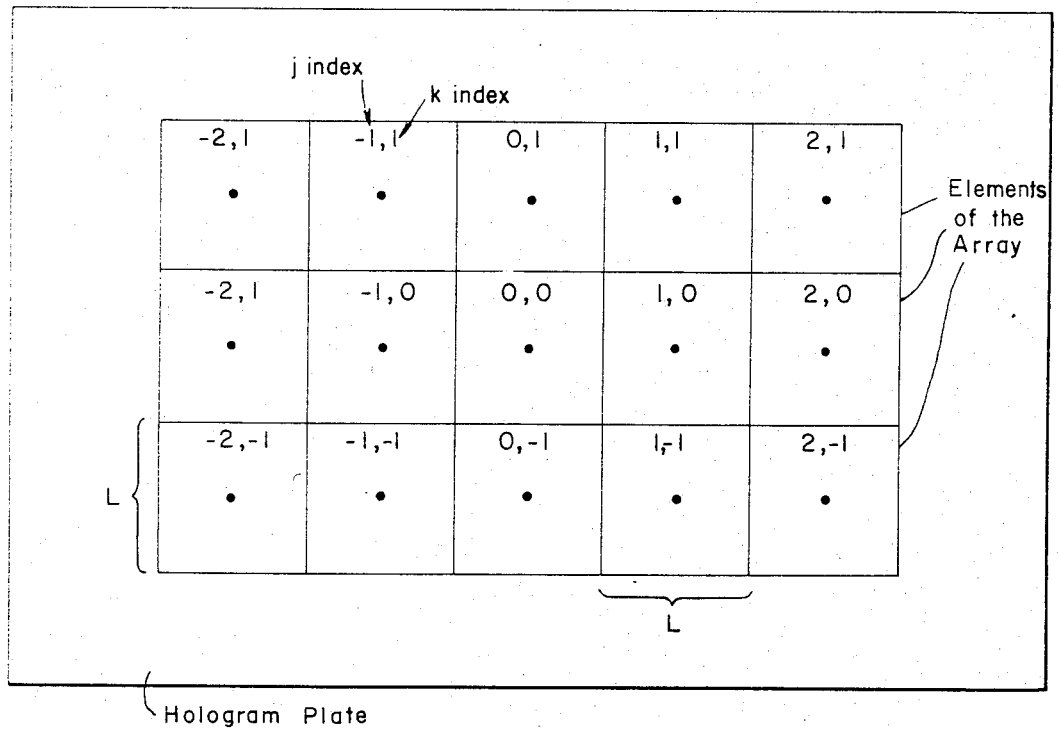
FIG. 15 illustrates an exemplary array of holograms formed with the apparatus of FIG. 14 to provide a holographic lens.

When the diverging beam, O, is directed toward the location of the center, Q, of the array on the plate, as shown in FIG. 15, and its axis is coplanar with points Q and I, the distance between the diverging beam pinhole source and point Q is the array focal length, $f$. The distance from point Q to the pivot point I is the pupil to array spacing $d$. The angle formed by points I, Q and the diverging beam pinhole is $\phi$, the viewing angle for the array. When aligned for the central hologram of the array, the diverging object beam axis and the collimated reference beam axis pass through the central point Q and have an included angle of $H = \pi - \phi$. The plate is oriented so that its plane bisects the angle H in this example, but that is not necessary.

The array is a set of contiguous holograms identified by indices (j,k) as indicated in FIG. 15, which for simplicity shows only a 3 × 5 array, as viewed from the diverging beam point source location. The hologram elements are all of the same size, but need not be squares of the dimension L shown.

FIG. 16 shows the array of diverging beam point source locations, as viewed from the area of mirror $C_4$. The central location corresponds to element (0,0) as described above. The displacement $l_{oI}$ from that location gives the location corresponding to element (1,0), etc. The location array in this example lies in a plane perpendicular to the central diverging beam direction but that is not necessary, and the displacement between the locations for two elements of the array is such that the new location is approximately coplanar with the old location and the centers of the two corresponding elements. The angular offsets of the collimated beam are chosen such that the collimated beam axis passes through the center of the particular hologram element and through the pivot point I.

Recursive equations for determining the $\Delta\theta_j$, where $\Delta\theta_j$ is the angular offset of the collimated beam axis between the (j−1,0) element and the (j,0) element, are as follows:

$$\tan \Delta\theta_j = \frac{\sin\left(\frac{H}{2} \pm \theta_{j-1}\right)}{\frac{d_{j-1}}{L} \pm \cos\left(\frac{H}{2} \pm \theta_{j-1}\right)} \quad (7)$$

$$d_j = d_{j-1} \frac{\sin\left(\frac{H}{2} \pm \theta_{j-1}\right)}{\sin\left(\frac{H}{2} \pm \theta_{j-1} \pm \Delta\theta_j\right)} \quad (8)$$

where $\theta_o = 0$, $d_o = d$, $$\theta_{j-1} = \sum_{m=1}^{j-1} \Delta\theta_m \quad (j \geq 2) \quad (9)$$

and the upper (lower) sign applies for $j$ negative (positive) in FIG. 15. The subscripts in Equations (7) through (9) are taken to be positive.

The quantities $\Delta\theta_k^j$, where $\Delta\theta_k^j$ is the angular offset of the collimated beam axis between the (j,k−1) and (j,k) elements, are given by the recursive Equations:

$$\tan \Delta\theta_k^j = \cos\theta_{k-1}^j / [(d_{k-1}^j/L) + \sin\theta_{k-1}^j] \quad (10)$$

$$d_k^j = d_{k-1}^j \cos\theta_{k-1}^j / [\cos(\theta_{k-1}^j + \Delta\theta_k^j)] \quad (11)$$

and $$\theta_{k-1}^j = \sum_{m=1}^{k-1} \Delta\theta_m^j \quad (k \geq 2) \quad (12)$$

where $\theta_o^j = 0$ and $d_o^j = d$ from Equation (8). Equations (10) through (12) hold for positive and negative $k$ in FIG. 15; the $k$ subscripts are positive, while the $j$ superscripts are psitive or negative corresponding to FIG. 15. This example does not allow a general skew geometry which may be provided if desired using more general equations to be set forth hereinafter.

An analysis leads to further sets of recursive equations for calculating the incremental displacements of the diverging beam point source (shown in FIG. 16) in terms of the array parameters and the angular offsets of the collimated beam, determined above. The $l_{j-1,j}$ of FIG. 9 are determined from the following formulas:

$$l_{j-1,j} = (X_{j-1,j}\sin\Delta\theta_j)/(\cos B_j), \quad (13)$$

$$X_{j,j-1} = (X_{j-1,j}\cos A_{j-1})/\cos B_j, \quad (14)$$

$$\tan \psi_j = \sin C_j/[(X_{j,j-1}/L) - \cos C_j], \quad (15)$$

and $$X_{j,j+1} = (X_{j,j-1} \sin C_j)/\sin D_j, \quad (16)$$

where $$\tan \psi_o = \sin C_o/[(2f/L) - \cos C_o], \quad (17)$$

$$X_{o1} = (f \sin C_o)/(\sin D_o), \quad (18)$$

$$B_j = B_{j-1} + \Delta\theta_j - \psi_{j-1}, \quad (19)$$

$$A_j = A_{j-1} + \psi_j - \Delta\theta_j, \quad (20)$$

$$C_j = C_{j-1} + \psi_{j-1} - j_j, \quad (21)$$

$$D_j = C_j + \psi_j, \quad (22)$$

$j = 1, 2, \ldots, A_o = \psi_o$, and $B_o = 0$. $C_o = H/2$ ($\pi - H/2$) for negative (positive) values of $j$ in FIG. 15. The subscripts in Equations (13) through (22) are taken to be positive (absolute value of $j$ in FIG. 15). The array focal length f, is as defined hereinbefore.

The $l_{k-1}{}^j{}_{,k}$ of FIG. 16 are determined by the following formulas:

$$l_{k-1}{}^j{}_{,k} = (X_{k-1}{}^j{}_{,k} \sin \Delta\theta_k{}^j)/\cos K_k{}^j, \quad (23)$$

$$X_{k}{}^j{}_{,k-1} = X_{k-1}{}^j{}_{,k} (\cos J_{k-1}{}^j)/\cos K_k{}^j), \quad (24)$$

$$\tan \psi_k{}^j = \cos K_k{}^j/[(X_{k}{}^j{}_{,k-1}/L) + \sin K_k{}^j], \quad (25)$$

and $$X_{k}{}^j{}_{,k+1} = X_{k}{}^j{}_{,k-1}(\cos K_k{}^j/\cos M_k{}^j), \quad (26)$$

where $$\tan \psi_o{}^j = L/2f_j, \quad (27)$$

$$f_j = [(L^2/4) + X^2{}_{j-1} - LX_{j,j-1}\cos C_j]^{1/2}, \quad (28)$$

$$X_{o1}{}^j = f_j/\cos \psi_o{}^j, \quad (29)$$

$$K_k{}^j = K_{k-1}{}^j + \psi_{k-1}{}^j - \Delta\theta_k{}^j, \quad (30)$$

$$J_k{}^j = J_{k-1}{}^j + \psi_k{}^j - \Delta\theta_k{}^j, \quad (31)$$

$$M_k{}^j = K_k{}^j + \psi_k{}^j, \quad (32)$$

where $K_o{}^j = 0$, and $J_o{}^j = \psi_o{}^j$. The $k$ subscripts are taken to be positive; the equations are independent of the sign of $k$ in FIG. 15. The subscript $j$ is positive or negative, corresponding to FIG. 15.

The equations in the above discussion therefore allow one to calculate the angular offsets of the collimated beam and the incremented displacements of the diverging beam point source in terms of the array parameters $\theta$, $L$, $d$, and $f$.

The array formation procedure is to set the collimated beam R to the angular offset corresponding to a certain element of the array using the pointer M and scale N; set the diverging beam point source position to the corresponding displacement from the central position, using the positioning elements PE; orient the gimbal K such that the diverging beam is directed toward the desired hologram position on the array; position the apertures F such that the desired hologram area is illuminated by both beams; and expose the hologram. This procedure is repeated for each hologram element of the array.

When the reflection hologram array is thus prepared, each element has its own point P for on-axis reconstruction as illustrated in FIG. 2a. In other words, for each element of the array on the holographic lens/combiner 20, a point P was selected during recording to provide a collimated beam to be viewed through an exit pupil shown in FIG. 7. The collimated beam, R, used during the transmission recording of each array element is positioned where the collimated beam appears on playback. In other words, each hologram element is recorded in an arrangement that is just the reverse of playback with respect to the diverging and collimated beams in the playback situation.

Preparation of a dichromated gelatin plate is standard practice, and processing of the exposed dichromated gelatin hologram plate is also standard practice. See "Holographic Optical Element for Visual Display Applications" by D.G. McCauley, et al., Applied Optics, 12, 232 (1973).

Since it is desirable for the holographic lens to have greater than 90 percent diffraction efficiency, the material must be capable of recording a thick (volume) and phase-modulated hologram. The theoretical maximum diffraction efficiencies for thin amplitude and thin phase holograms are 6.25 percent and 33.9 percent, respectively, whereas thick phase holograms can achieve up to 100 percent efficiency.

The geometrical constraints of the head-up display system determine both the maximum allowable film thickness and minimum refractive index change in the material, since these factors have a direct bearing on a hologram's angular selectivity. Typically, a ±3° field coverage is required from each element of a hologram array for display purposes to cover the desired field with an adequate number of elements. The following equation is useful to calculate the film thickness necessary to satisfy this condition, $$\Delta\theta \approx K\lambda/(2\,dn\sin\theta) \quad (33)$$

where $\Delta\theta_R = 3°$, the angle of half-width at half-maximum reflection, $K \approx 3$, a factor determined experimentally from dichromated galatin holograms, $\lambda$ is the light wavelength, $d$ is film thickness, $n \approx 1.5$, the refractive index, and $\theta \approx 30°$, the angle between the normal to the hologram plane at the point of reflection and either the incoming or reflected rays. Performing the substitutions, the maximum allowable film thickness becomes approximately 25 μm.

For a phase hologram, the film thickness dictates the minimum refractive index change necessary to develop a given diffraction efficiency. The following equation is used for a reflection hologram.

$$\eta = \tan h^2 (\pi \Delta\, nd/\lambda \cos \theta) \quad (34)$$

Substituting the value $\eta = 90\%$, the diffraction efficiency, and solving for $\Delta n$, the required index change, a value of 0.0127 is obtained.

The thickness and index change requirements can be somewhat relaxed by modifying the array geometry (e.g., making $\theta$ smaller), but large deviations from the thickness or index limit can only be made by sacrificing efficiency or angular response of the holographic lens.

Presently, many materials exist in which holograms can be recorded, but of these only a few can be seriously considered for the present application. The criterion of a thick phase material immediately disqualifies the bulk of holographic materials, such as silver halide emulsions (conventional development), thermoplastic zerography materials, transient photochromics, etched photoresists, kinoform materials, and magneto-optic materials. The remaining materials which may be considered as roughly grouped in classes in the following table where most of their important characteristics are listed.

light. However, due to the recency of the development, little quantitative data is available.

The two examples of direct optical effect materials, lithium niobate and arsenic sulfur glass, offer several material deficiencies, which are typical of this class of materials. Very large exposures are required, only small index changes can be achieved and reported maximum diffraction efficiencies are far from the required 90 percent level. Furthermore, many of these materials form holgrams that are adversely affected by exposure to visible light. There are also fabrication difficulties for the crystal or quasi-crystal materials in forming a large head-up display. Therefore, direct optical effect materials are not recommended for use in their present form. They have been included in Table I for the sake of completeness. As a class of thick phase holographic materials, the gelatin systems offer the most promise in the current application. Both obtainable index changes and resolution are well within the required limits.

With bleached silver halide emulsions, 64 percent efficiency can be achieved in 18 μm thick films for two beam holograms, and it is believed that higher efficiencies can be accomplished by increased film thickness. The primary disadvantage of this material lies in the film thickness decrease upon plate processing. It has been found that the Kodak 649F emulsion typically shrinks 15 to 18 percent after fixing and drying due to removal of material from the film in the processing. This means that the reflection hologram fringe would make a corresponding wavelength shift. For example, a hologram recorded at 632.8 nm would change its peak reflection wavelength to about 530 nm after processing. Glycerol or triethanolamine have been used to

TABLE I.—PHASE HOLOGRAPHIC MATERIALS AND PROPERTIES

| Material | Refractive index change (X .01) | Diffraction efficiency (percent) | Typical exposure (mJ/cm²) | Resolution (cycles/mm) |
|---|---|---|---|---|
| 1. Photopolymers: | | | | |
| a. Ba acrylate | 1.0 | 45 | 0.6 | 3000 |
| b. Optical cement | .5 | 98 | 8200 | >5000 |
| c. Dye sensitized photoresist | | 10 | 10000 | >4000 |
| 2. Direct optical effect materials: | | | | |
| a. Lithium niobate | .004 | 40 | $10^5$ | 4000 |
| b. Arsenic sulfer glass | | 18 | 9000 | |
| 3. Gelatin systems: | | | | |
| a. Bleached silver halide emulsions | 2.0 | 64 | .11 | >2000 |
| b. Dye-alcohol sensitized gelatin | | | | >4000 |
| c. Dichromated gelatin | 2.0 | >90 | 30 | 6000 |
| d. Dye sensitized dichromated gelatin | 2.0 | >50 | 2000 | >4000 |

The first example of a photopolymer, barium acrylate, is not regarded to be satisfactory in resolution and high diffraction efficiency. Moreover, it has stability and environmental disadvantages. Therefore, it is not recommended for use in its present form.

It has recently been shown that commercially available optical cements can be dye-sensitized and used to fabricate high-efficiency, low-noise thick phase holograms. When considering the current application, two major disadvantages become apparent: index changes of only 0.005 have been realized and several J/cm² are required to achieve diffraction efficiencies of 90 percent in the reported composition. However, favorable material characteristics of low noise, high resolution, self-development and good environmental stability otherwise recommend this material.

Recent work has shown that dye-sensitized photoresist, a polyvinyl cinnamate compound, is capable of recording reflection phase holograms with He-Ne laser control the shrinkage of the emulsion to eliminate color shift, but this process tends to make the bleach products less stable and darken with exposure to light. Because of these problems, this shrink control technique is not an acceptable approach. It would be better to simply allow for the shrinkage in making the hologram array.

Dye-alcohol sensitized gelatin, has red light sensitivity, resolution >4,000 cycles/mm, and grating permanence upon development after exposure. However, as is the case with dye-sensitized photoresist, little quantitative data is available on this material.

Dichromated gelatin is the best available material for the present application. This material has proved very successful in single element holograms, operating in the green spectral region. Its spectral sensitivity is limited to blue and green light, and the longest exposure wavelength is restricted to about 520 nm. The final material in Table I dye-sensitized dichromated gelatin, can be used for systems requiring material response at longer wavelengths. Its properties are very similar to those of normal dichromated gelatin.

As shown in a graph of spectral efficiency in FIG. 17, dichromated gelatin is capable of a high optical efficiency, small dichroic effects, and low scattering, all of which are desirable characteristics for display applications. Consequently, by using a liquid crystal array as a light modulator to create the image to be displayed, it is a simple matter to select a light source of high brightness, high efficiency in the narrow operating bandwidth of the holographic lens. However, assuming other factors dictate a particular light source for the image, such as a particular CRT, it is possible to adapt the holographic lens to the light source. For example, dichromated gelatin is insensitive at the wavelength of phosphor emission at 547 nm; this requires exposures to be made with an argon ion laser at 514.5 nm, or at 488 nm, but with proper processing techniques it is possible to expand the gelatin layer so that the response is shifted toward longer wavelengths. Therefore, if phosphor emission at 547 nm is to be used for the display image source, exposure can be made at 514.5 nm if the gelatin layer is thereafter expanded to shift the holographic lens response to 547 nm. Expanding the gelatin layer is accomplished by control of the water retained during the processing, i.e., by control of the drying time. (See McCauley, supra.)

A test procedure for evaluating the holographic lens will now be described with reference to FIGS. 18a and 18b. The processed holographic lens is held in a suitable mount (not shown). A transparency 28 of a grid pattern is positioned in the plane of diverging beam point source locations used to form the lens array and illuminated by a beam of narrow band (≈ 100 A) light within the reflectivity peak of the array. A low power telescope 29 with an objective aperture size approximately equal to L, the size of the array elements, is used to view the array of hologram elements. The telescope is mounted in a gimbal mount 29', which allows the telescope to be pivoted about the center of its objective. This pivot point also coincides with the location of the pivot point I (relative to the array) in the array forming apparatus (see FIG. 14). The telescope is focused at infinity.

The evaluation procedure is as follows. The telescope is oriented via its gimbal mount, to be directed toward the intersection of two hologram elements in the array, corresponding to one of the diverging beam point source incremental displacements of FIG. 16. The projected aperture of the telescope will then lie on the two hologram elements of interest, as indicated in FIG. 11b for elements (1,0) and (2,0). The field of view of the telescope includes the images of a vertical line (or horizontal line as required) in the grid pattern of the transparency as formed by the two elements of interest. The angular displacement $\Delta\phi$ (if any) of these two images can be observed. Furthermore, by alternately covering the two elements of interest in the array, the corresponding images can be identified and the direction of the displacement can be ascertained.

The set of angular errors $\Delta\phi$, one for each of the incremental displacements of FIG. 16, can be corrected by adding corrections to the incremental displacements calculated using the discussion set forth hereinbefore of point 2 in the brief outline given first. The corrections, $\delta$, are calculated by multiplying $\Delta\phi$ in radians by the average of $f_j$ for the two elements of interest, where the $f_j$ are given by Equation (22). For example, $\delta_{12} = \Delta\phi_{12}(f_1 + f_2)/2$ is the correction to $l_{12}$ of FIG. 16, corresponding to elements (1,0) and (2,0). If the image formed by the element farther away from the center of the array appears nearer to (farther from) the line between points I and Q referred to in connection with FIGS. 14 and 15 (projected to infinity) than the image formed by the element nearer to the center of the array, the corresponding incremental displacement is decreased (increased) by the amount of the correction. For example, if the image due to (2,0) appears outside the image due to (1,0) (relative to the line between points I and Q), $l_{12}$ is increased by $\delta_{12}$.

After an array has been formed with angular errors $\Delta\phi$ within the system requirements, this array is ready for use in the display system illustrated schematically in FIG. 7. The holographic combiner/lens 13 is the corrected hologram array.

The wavelength for the source of light is selected to have a narrow band matching the spectral efficiency of the hologram material, such as shown in FIG. 17 for dichromated gelatin. To the rest of the spectrum, the hologram array acts as a clear glass. Consequently, a viewer is able to look through the holographic lens at a distant scene and see a focused image from the plane 14 superimposed on the scene. In that manner, the holographic lens also functions as a combiner.

Figure 20:
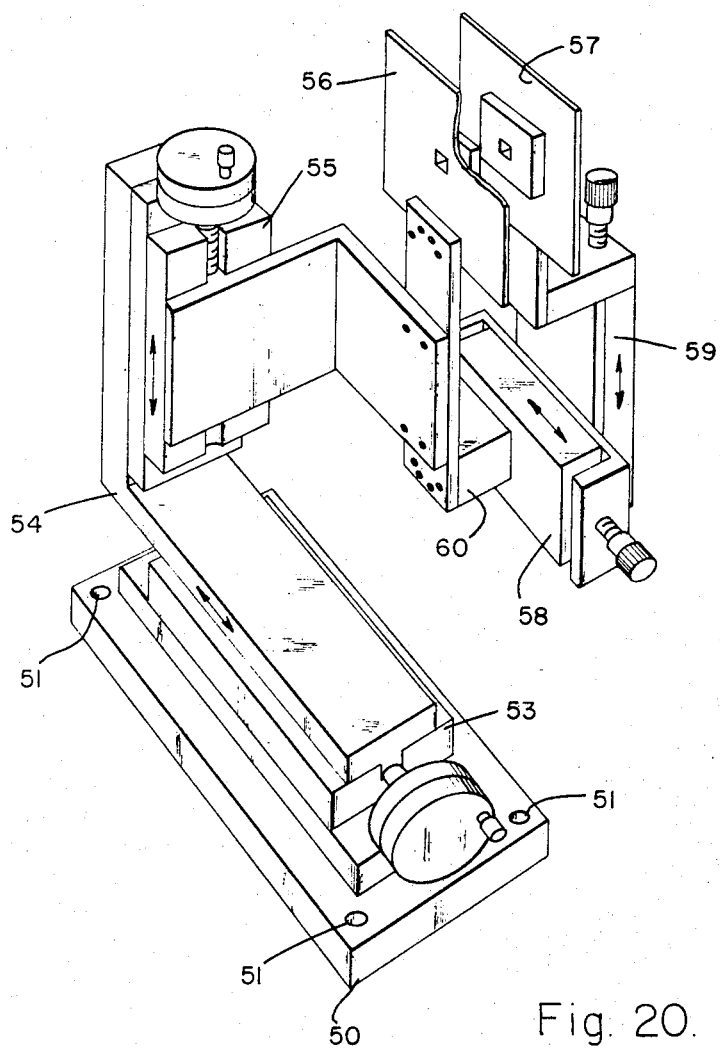

Apparatus for producing an array of holograms on a photographic plate will now be described with reference to FIGS. 19 and 20. This apparatus performs the same function as the system shown schematically in a plan view in FIG. 14.

Referring first to FIG. 19, the diverging object beam is shown emerging from a pinhole 30 in a gimbal mount 31 having vertical and horizontal axes about which a beam expander and spatial filter 33 are pivoted to aim the axis of the diverging beam to the respective centers of holographic elements to be produced on a photographic plate 34 in a holder 35. A mirror 36, corresponding to mirror $C_4$ in the system of FIG. 14 is moveable and adjustable to direct coherent light from a source, e.g., a laser not shown, into the beam expander in a direct line with the pinhole 30 and the center of the holographic element to be exposed next. Also not shown are other mirrors and a beamsplitter corresponding to mirrors $C_1$ through $C_3$ and a beamsplitter B of FIG. 14 used to obtain the reference beam R from the same coherent source. Also not shown is a recollimating telescope and spatial filter employed to provide a collimated beam somewhat larger than the holographic elements to be formed.

Figure 14:
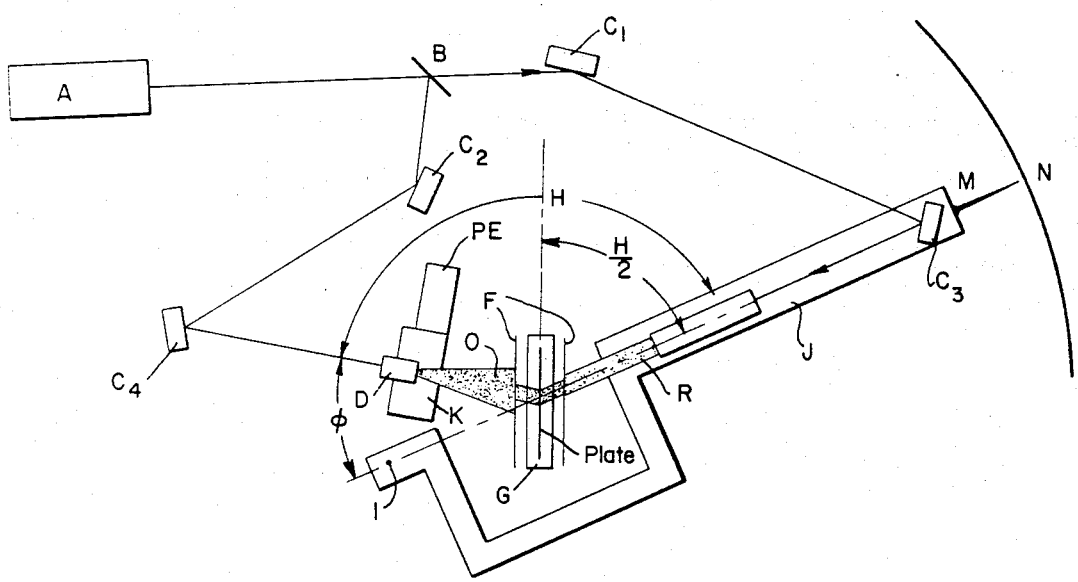
FIG. 14 illustrates schematically apparatus for constructing a reflection-type holographic lens.

In the system of FIG. 14, a pivot arm is employed to position a recollimating telescope and spatial filter E about a pivot point I, but in practice it is more convenient to maintain all elements involved in directing a collimated reference beam to the holographic plate fixed and to position the plate with respect to the fixed collimated beam, and to then properly position the diverging beam source at the desired angle $\phi$. To be able to do that, the plate holder 35 is attached through a plate 37 to a table 38 which is mounted for rotation about a horizontal axis 39 to a table 40 that is mounted on a base 41 for rotation about a vertical axis 42. The intersection of the horizontal axis 39 and the vertical axis 42 at a point 44 in space effectively provides the pivot point I of the system described with reference to FIG. 14. In other words, by tilting the tables 38 and 40 about horizontal and vertical axes, the collimated beam R may be pivoted with respect to the plate 34 about the fixed point 44. Note that the axis of the collimated reference beam R passes through the point 44. In that manner the collimated beam is positioned from element to element of the array. The position of point 44 in space relative to the array of holographic elements constitutes the center of the viewing pupil during playback.

Assuming the image source during playback is to be a flat source, the pinhole 30 is positioned for each holographic element to be formed on a plane as described with reference to FIG. 8. To move the pinhole about in a flat plane, a vertical positioning mechanism 46 is mounted on a vertical leg of an L-shaped member 47 connected to a horizontal positioning mechanism 48. The latter is in turn mounted on a slide 49 which can move along a third axis normal to the plane of vertical and horizontal positions of the pinhole, i.e., normal to the plane of the point sources, in order to adjust the distance of the pinhole 30 from the photographic plate when the image to be projected is not to be a flat surface. The distance between the center of the plate and the point 44 is fixed to define the distance of the pupil center to the center of the holographic lens.

The photographic plate 34 needs to be masked while each hologram (holographic lens element) is being exposed. That is accomplished by the apparatus of FIG. 20. A base plate 50 is bolted through holes 51 on the plate 37 having threaded holes 52. A horizontal positioning mechanism 53 carries an L-shaped member 54, which in turn carries a vertical positioning mechanism 55. Those mechanisms are used for positioning masks 56 and 57 on opposite sides of the photographic plate. Smaller positioning mechanisms 58 and 59 are employed for fine positioning of the mask 57 in respective horizontal and vertical directions. This fine positioning of the mask 57 is necessary to properly align the mask 57 with the mask 56 on opposite sides of the same area of the plate for different angles of incidence of the diverging beam 30. A spacing bar 60 passes through an opening 61 in the plate support member 35.

A planar array of holographic lens elements has been assumed for the convenience of describing the invention. A flat point source surface, and therefore a flat image source during playback has also been assumed for convenience. The present invention is not, however, so limited. It may be used to form a multi-element holographic lens on the inside of a Plexiglas face mask on a pilot's helmet as well as on a flat or curved substrate (such as the aircraft canopy) for display of information. In each case the holographic lens functions as a combining glass to combine the outside scene with the display from an image plane. The apparatus just described for forming a holographic lens can obviously be modified for other than a flat lens and/or flat image source.

Figure 21:
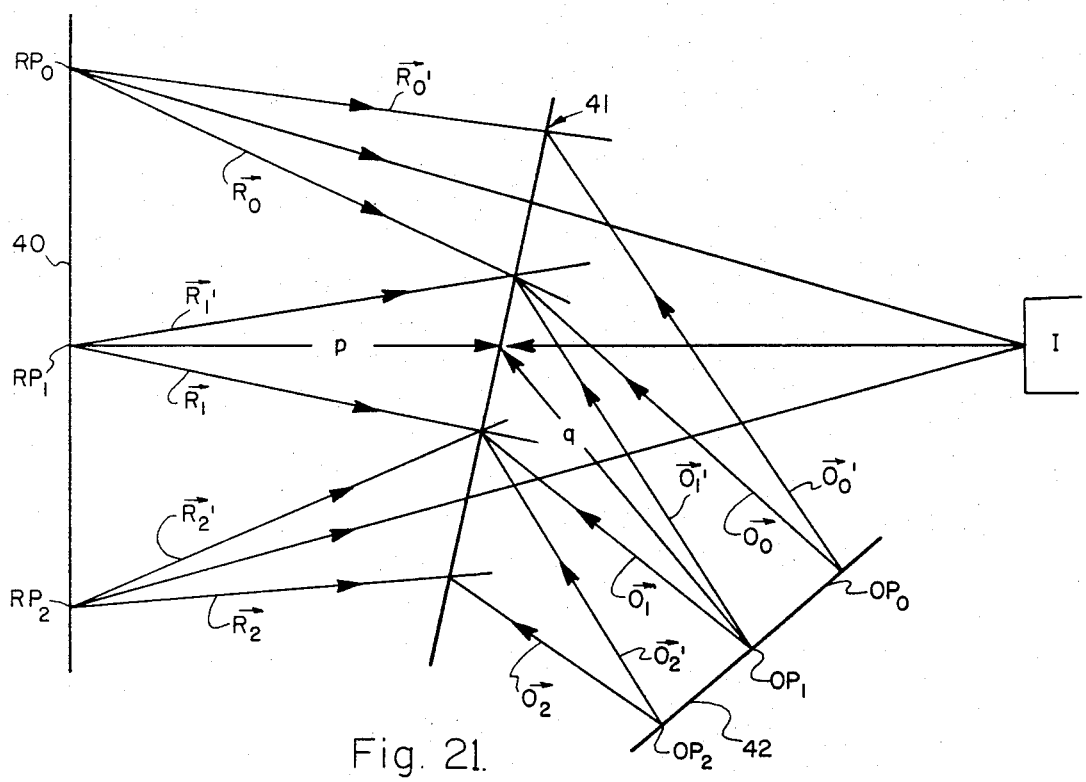
FIG. 21 is a diagram similar to that of FIG. 8, but illustrating the geometry for a reflection-type holographic lens with reference beam point sources on a surface not at infinity.

As noted hereinbefore, either transmission-type or reflection-type holographic lenses may be made by producing arrays of holograms aligned at intersections as described. In either case, the reference beams need not originate on a surface virtually at infinity. FIG. 21 illustrates the geometry for a reflection-type lens with a reference plane 40 at some finite distance, p, from the center of an array 41, and an object plane 42 at a distance $q$. The focal length, $f$, of the lens thus produced is given in a manner similar to a conventional lens by the relationship $$1/f = (1/p) + (1/q)$$

In constructing each hologram of the array, the relationship of Equation (5) is maintained for the object and reference beams at the intersections to be aligned. Obviously not all intersections of an array can be aligned, bu the direction of the beams can adjust to provide an average error in the alignment of all intersections that is within the system requirements. The average error can be alternatively or further increased in a given system by increasing the number of elements used to fill the required aperture because the smaller the dimension of a given element the less the disparity in alignment of opposite edges.

Figure 22:
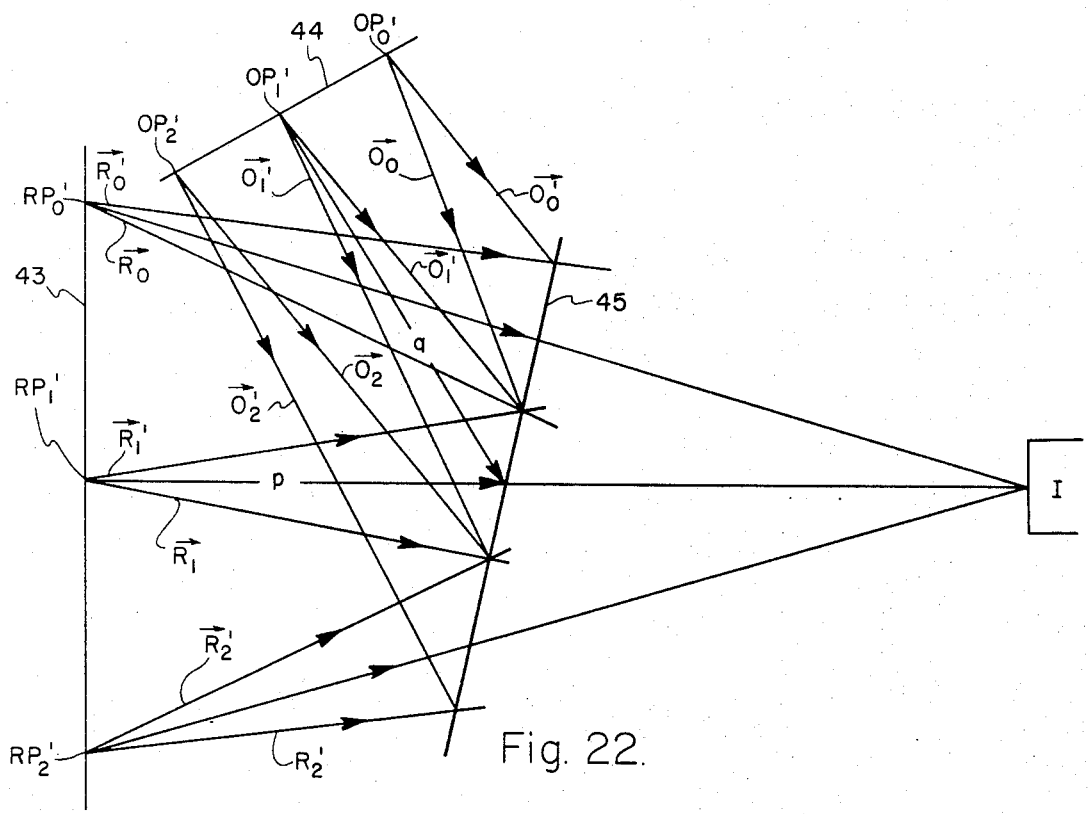
FIG. 22 is a diagram similar to that of FIG. 21, but illustrating the geometry for a transmission-type holographic lens.

FIG. 22 illustrates the geometry for a transmission-type lens with a reference plane 43 at a distance p and an object plane 44 at a distance q from the center of an array 45. The focal length of the lens is the same as for the reflection-type lens of FIG. 21 having similar geometry. The difference is that with the lens of FIG. 22, the image source during playback is placed on the opposite side of the lens from the exit pupil.

A holographic lens constructed in accordance with the present invention will have predetermined focal power. Consequently, general principles of optics will apply as with conventional lenses as to focus and use, and different combinations of holographic lenses may be used together. For example, a transmission-type holographic lens may be placed behind a reflection-type holographic lens to produce a pseudo in-line transmission lens in a manner suggested with reference to FIG. 1. Still other geometries and combinations may occur to one skilled in the art. Consequently, the following claims are intended to cover all such possibilities.

What is claimed is:

1. A holographic lens comprised of an array of contiguous non-overlapping holograms on a single film of light-sensitive material, each hologram comprising a recording of a unique interference pattern formed by interference between two mutually coherent beams of light, each beam originating at a point source in a different one of two surfaces, each surface consisting of an array of contiguous segments and each hologram being formed with a uniquely located point source in a unique segment of each said surface, thus providing a holographic lens with conjugate focal points on said two surfaces such that when the lens is thereafter illuminated by point sources of playback light in one surface forming an image, said points of playback light are imaged in the other surface, thereby projecting an image from one surface onto the other surface, and wherein discontinuities in said projected image are minimized by so choosing the locations of said two beams of light for constructing said holograms that fringe planes in some adjacent holograms are parallel at the intersection of the holograms.

2. A holographic lens as defined in claim 1 wherein one of said surfaces of point sources is virtually a plane at infinity, thus forming a collimating lens for projecting out to infinity an image from the other surface.

3. A holographic lens as defined in claim 2 wherein said one of said surfaces of point sources that is virtually at infinity is on the opposite side of said film of light-sensitive material during construction, whereby said lens is a reflection-type holographic lens.

4. A holographic lens as defined in claim 2 wherein said one of said surfaces of point sources that is virtually at infinity is on the same side of said film of light-sensitive material during construction, whereby said lens is a transmission-type holographic lens.

5. A holographic lens as defined in claim 1 wherein said two surfaces of point sources are on opposite sides of said film of light-sensitive material during construction, whereby said lens is a reflection-type holographic lens.

6. A holographic lens as defined in claim 1 wherein said two surfaces of point sources are on the same side of said film of light-sensitive material during construction, whereby said lens is a transmission-type holographic lens.

7. A holographic lens as defined in claim 1 wherein the direction of said two beams during construction of said holograms are specified by unit vectors $\vec{R}$ and $\vec{O}$, and said interference pattern is recorded in the form of interference fringe planes normal to a unit vector $\vec{N}$ which varies directly as $\vec{O} - \vec{R}$, and two independent sets of fringe planes defined by their normals $$\vec{N_1} \alpha \vec{O_1} - \vec{R_1}$$

and $$\vec{N_2} \alpha \vec{O_2} - \vec{R_2}$$

are provided for selected pairs of adjacent holograms with $\vec{N_1}$ equal to $\vec{N_2}$ at their intersection, thereby providing parallel fringe planes at their intersection for minimum discontinuity of focal power at said intersection.

8. A method for producing a holographic lens on a substrate comprising
providing a light-sensitive film on said substrate,
producing an object beam of narrow bandwidth and with substantial spatial coherence,
producing a reference beam of the same narrow bandwidth and with substantial spatial coherence as said object beam,
masking said film for exposure of said light-sensitive material to said object beam and said reference beam in discrete contiguous areas, each exposed area forming a single hologram, said beams penetrating said film being mutually coherent in said film to produce an interference pattern,
orienting said beams of light during exposure of each area such that said object beam appears to emanate from a point on a first surface and said reference beam appears to emanate from a second surface, each surface consisting of an array of contiguous segments and each hologram being formed with a uniquely located beam in a unique segment of each said surface, thus constructing a holographic lens with conjugate focal points on said two surfaces such that when the lens is thereafter illuminated by point sources of playback light in one surface forming an image, said points of playback light are imaged in the other surface, thereby projecting an image from one surface onto the other surface, and wherein discontinuities in said projected image are minimized by so choosing the locations of said two beams of light for constructing said holograms that fringe planes in some adjacent holograms are parallel at the intersection of the holograms.

9. A method as defined in claim 8 wherein one of said surfaces of point sources is virtually a plane at infinity, thus forming a collimating lens for projecting out to infinity an image from the other surface.

10. A method as defined in claim 9 wherein said one of said surfaces of point sources that is virtually at infinity is on the opposite side of said film of light-sensitive material during construction, whereby said lens is a reflection-type holographic lens.

11. A method as defined in claim 9 wherein said one of said surfaces of point sources that is virtually at infinity is on the same side of said film of light-sensitive material during construction, whereby said lens is a transmission-type holographic lens.

12. A method as defined in claim 8 wherein said two surfaces of point sources are on opposite sides of said film of light-sensitive material during construction, whereby said lens is a reflection-type holographic lens.

13. A method as defined in claim 8 wherein said two surfaces of point sources are on the same side of said film of light-sensitive material during construction, whereby said lens is a transmission-type holographic lens.

14. A method as defined in claim 8 wherein the direction of said two beams during construction of said holograms are specified by unit vectors $\vec{R}$ and $\vec{O}$, and said interference pattern is recorded in the form of interference fringe planes normal to a unit vector $\vec{N}$ which varies direcgly as $\vec{O} - \vec{R}$, and two independent sets of fringe planes defined by their normals $$\vec{N_1} \alpha \vec{O_1} - \vec{R_1}$$

and $$\vec{N_2} \alpha \vec{O_2} - \vec{R_2}$$

are provided for selected pairs of adjacent holograms with $\vec{N_1}$ equal to $\vec{N_2}$ at their intersection, thereby providing parallel fringe planes at their intersection for minimum discontinuity of focal power at said intersection.

15. A method as defined in claim 8 wherein said object beam is a diverging beam and said reference beam is a collimated beam, whereby said object beam emanates from said first surface at a finite distance from said film and said reference beam emanates from said second surface at a virtually infinite distance.

16. A method as defined in claim 15 wherein the directions of unit vectors $\vec{R}$ of the reference beam are specified by lines connecting the centers of said areas with the center of a viewing pupil at a desired distance from the center of a central one of all said areas, and the directions of unit vectors $\vec{O}$ of the object beam are specified as follows: for said control area constituting a first hologram, the direction of the unit vector $\vec{O_1}$ is specified by establishing the center of said first surface from which said object beam emanates and said center of all said areas; and for all other areas constituting holograms of said lens, the directions of unit vectors $\vec{O_i}$ for the object light beam are chosen to produce two independent sets of fringe planes in adjacent areas, said fringe planes being defined by their normals $$\vec{N_i} \alpha \vec{O_i} - \vec{R_i}$$

and $$\vec{N_{i+1}} \alpha \vec{O_{i+1}} - \vec{R_{i+1}}$$

where said unit vector $\vec{N}_i$ and $\vec{N}_{i+1}$ normal to said fringe planes are parallel and said vectors $\vec{O}_i, \vec{R}_i, \vec{O}_{i+1}$ and $\vec{R}_{i+1}$ specify directions of said diverging and collimated beams at intersections between adjacent areas that are to be aligned at their intersections.

17. A method as defined in claim 16 wherein directions of said object and reference beams are from opposite sides of said film to form a reflection-type lens.

18. A method as defined in claim 17 wherein directions of said object and reference beams are from the same side of said film to form a transmission-type lens.

* * * * *